Sept. 5, 1967  R. L. PRICKETT ET AL  3,340,396
UNIVERSAL X-RAY CRYSTALLOGRAPHY CAMERA WITH SPECIFIC
MEANS FOR MOVABLY SUPPORTING A SPECIMEN
IN THE X-RAY BEAM PATH
Filed Oct. 26, 1964
5 Sheets-Sheet 1
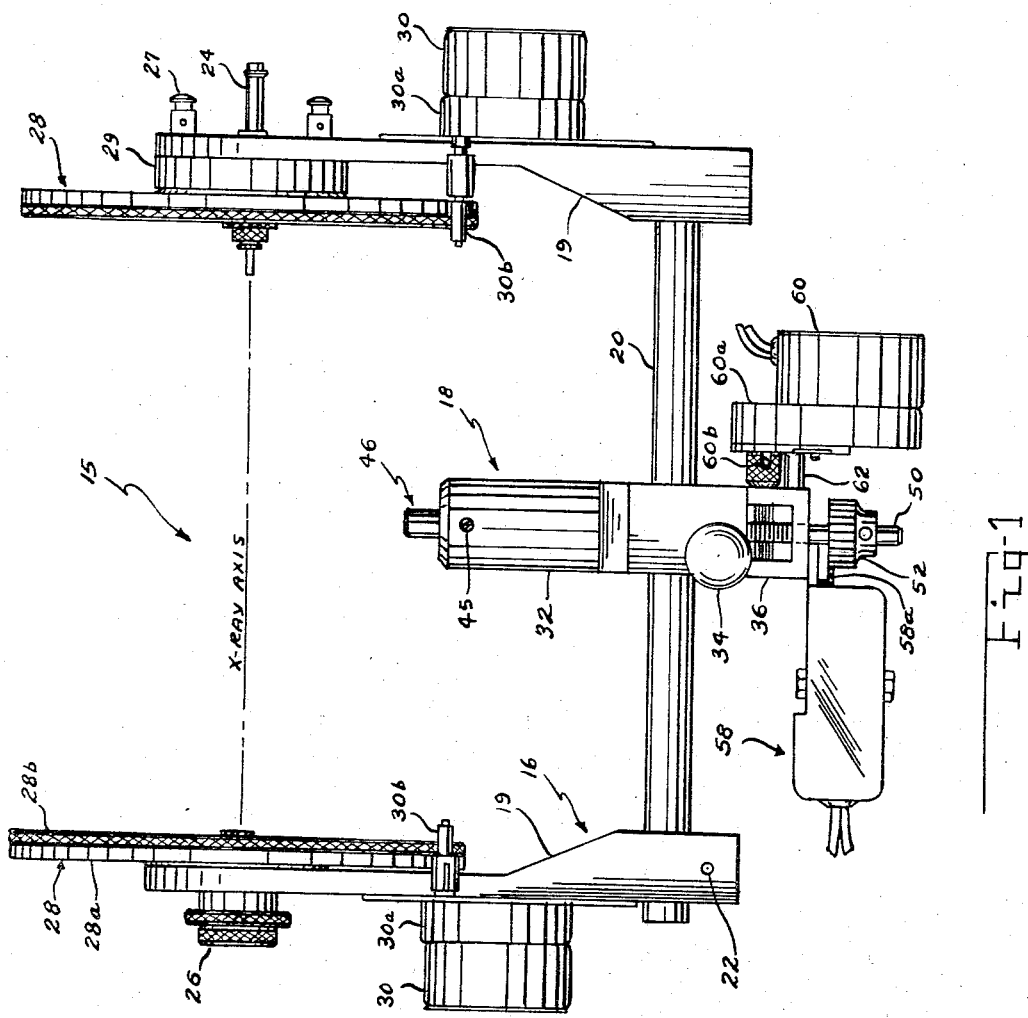
INVENTORS
ROBERT L. PRICKETT
JOHN R. FENTER
VERL R. ROBINSON
BY Harry A. Herbert Jr
and Louis E. Tay
ATTORNEYS

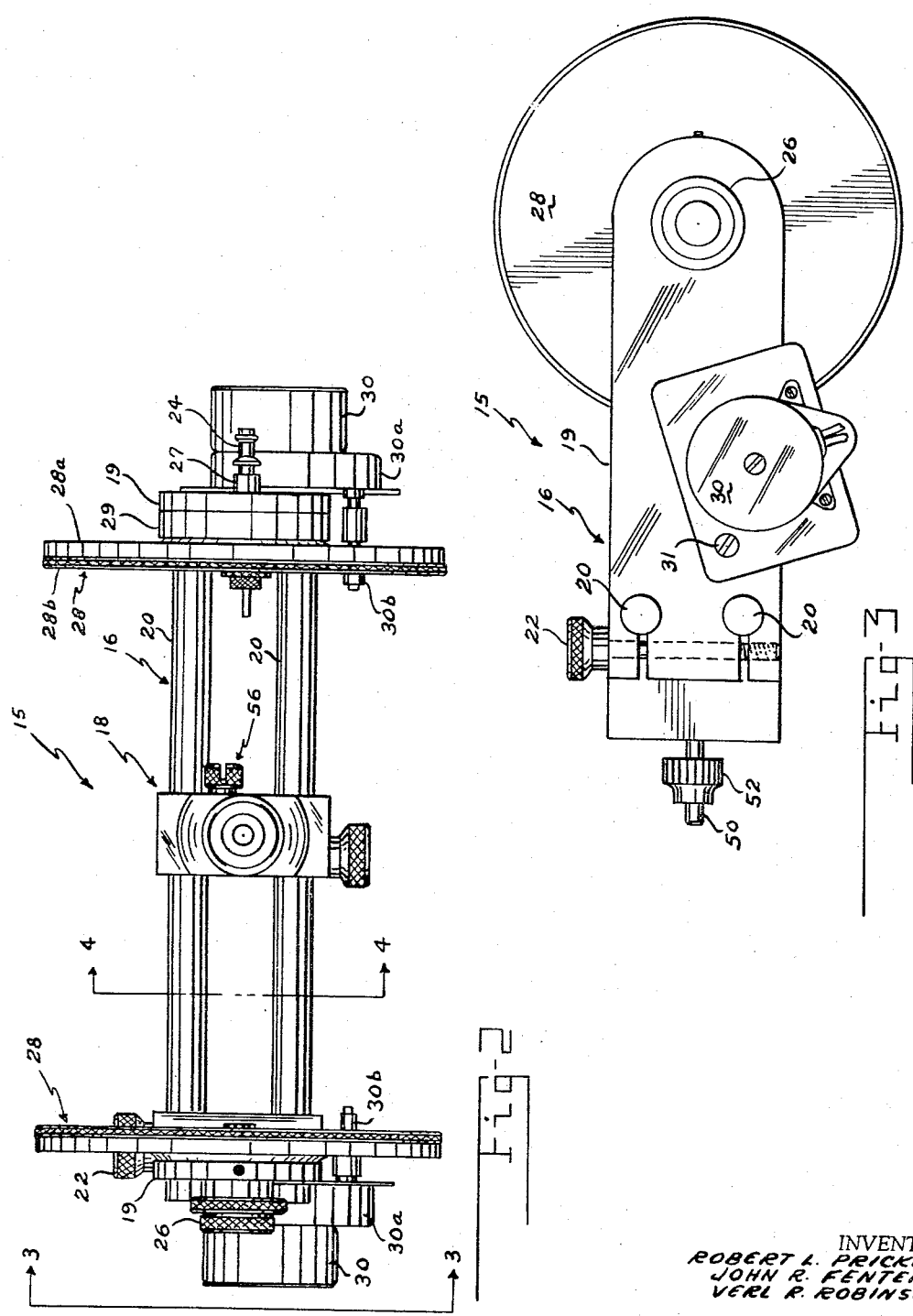

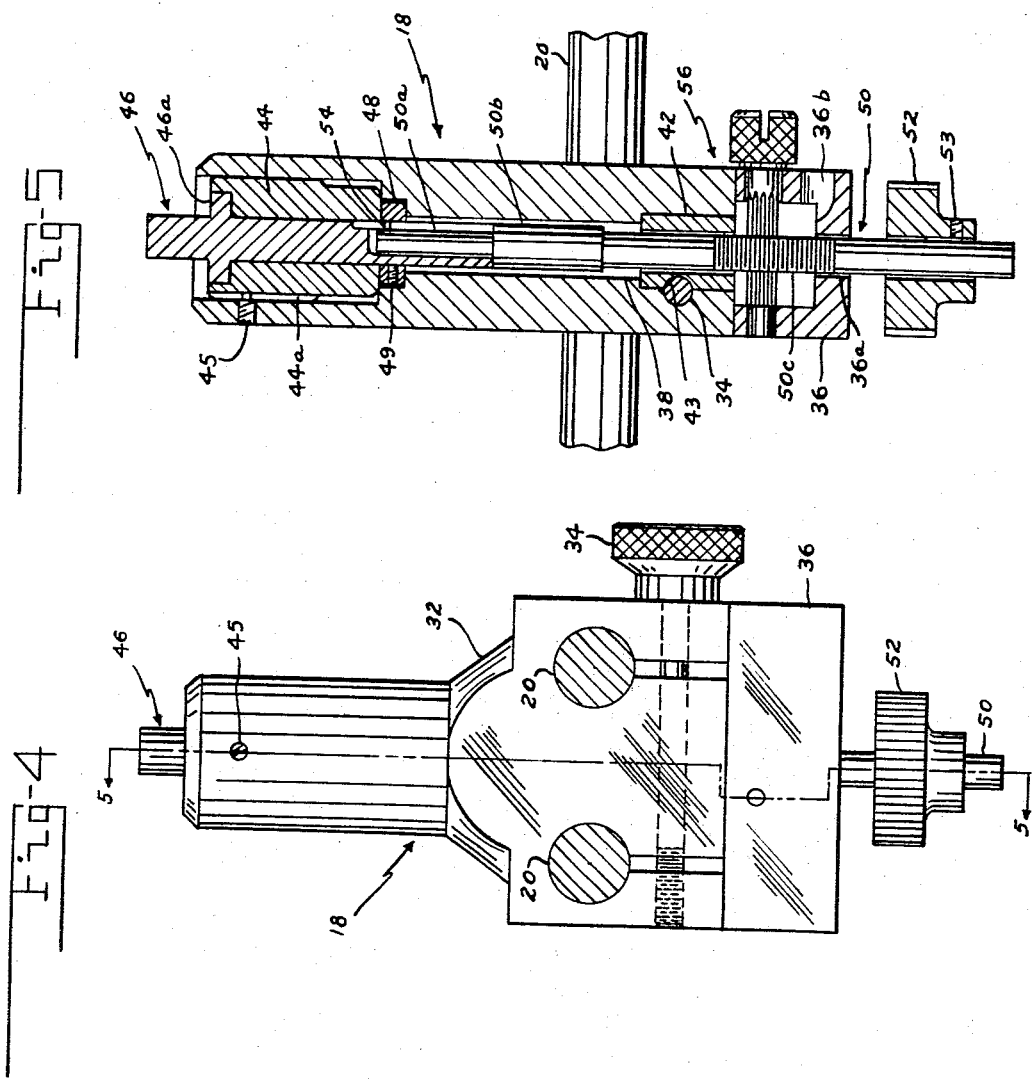

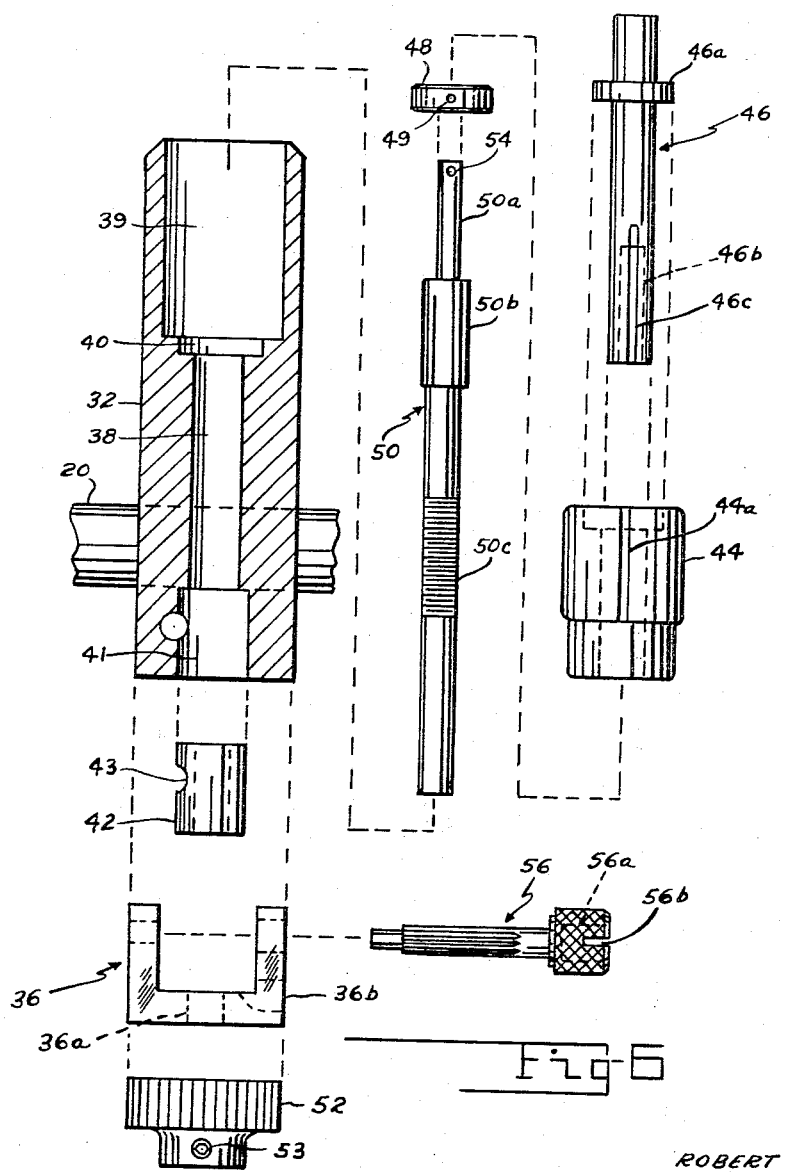

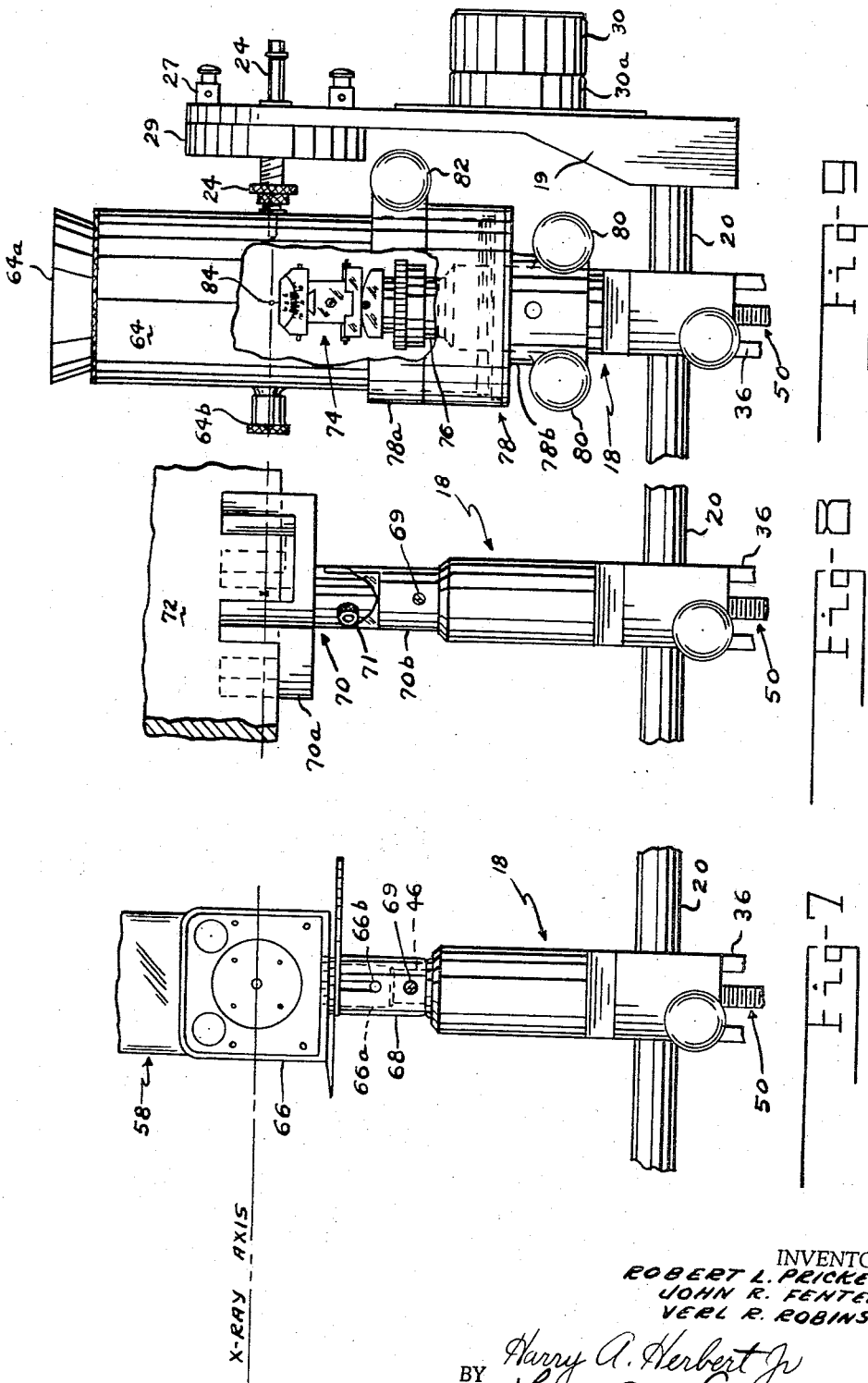

ns patent office 3,340,396
Patented Sept. 5, 1967

3,340,396
UNIVERSAL X-RAY CRYSTALLOGRAPHY
CAMERA WITH SPECIFIC MEANS FOR
MOVABLY SUPPORTING A SPECIMEN
IN THE X-RAY BEAM PATH
Robert L. Prickett and John R. Fenter, Dayton, and Verl R. Robinson, Wilmington, Ohio, assignors to the United States of America as represented by the Secretary of the Air Force
Filed Oct. 26, 1964, Ser. No. 406,630
3 Claims. (Cl. 250—51.5)

ABSTRACT OF THE DISCLOSURE

An X-ray crystallography camera comprising a frame unit having parallel upright side members supporting a horizontal guide means below and parallel to a collimated X-ray beam passing through the side members adapted for rotatably supporting disc film holding cassettes coaxial with the X-ray beam, and a sample actuating support unit slidably mounted on the horizontal guide means of the frame unit to extend upward at right angle to the X-ray beam, the sample actuating support unit having an accessory shaft and means for generating independent controlled rotary and axial movement to the accessory shaft which supports interchangeable specimen holding accessories in the X-ray beam path.

The invention described herein may be manufactured and used by or for the United States Government for governmental purposes without the payment to us of any royalty thereon.

This invention relates to camera apparatuses and more specifically to cameras used in the field of crystallography. Still more specifically, this invention relates to cameras for attachment to the camera mount on a diffraction unit such as a Siemens Crystalloflex IV as manufactured by Siemens and Halske AG in Karlsruhe, Germany.

Many camera apparatuses have been designed and used in the past to produce crystallography data on film using one of the standard diffraction procedures. It has usually been necessary to change to an alternate camera apparatus each time a different diffraction procedure is to be initiated. The inherent single purpose of these previous cameras has resulted in the uneconomical use of the crystallographer's time as well as the necessity for numerous cameras which must be stocked and protected.

The universal camera constituting this invention, and to be disclosed, has been found extremely useful and time saving in the conduct of many standardized and nonstandardized diffraction studies including powder identification, glancing angle shots, precision lattice parameter measurement, stress analysis with or without integration, texture analysis with or without integration, wire pole figure studies with rotational and vertical integration, single crystal oscillation and rotation photographs, and Laue photographs with or without integration.

A primary object of this invention is to provide a universal X-ray crystallography camera which will replace a multiplicity of single purpose cameras.

Another object of this invention is to provide a crystallography camera capable of performing functions beyond the scope of prior cameras.

A further object of this invention is to provide a universal X-ray crystallography camera adapted to receive a series of standard accessories for the performance of various studies.

Yet another object of this invention is to provide a universal X-ray crystallography camera in which the set-up required to perform various functions may be altered without removing the camera from the diffraction unit to which it is attached.

A still further object of this invention is to provide a universal X-ray crystallography camera of utmost simplicity, reliability and ease of use.

Additional objects, advantages and features of the invention reside in the construction, arrangement and combination of parts involved in the embodiment of the invention as will appear from the following description and accompanying drawings wherein FIG. 1 is a side elevation of the camera without standard attachments used to hold the material samples being photographed, FIG. 2 is a plan view of the camera of FIG. 1 with sample rotating and elevating motors omitted for clarity, FIG. 3 is an end elevation along line 3—3 on FIG. 2, FIG. 4 is an enlarged section along line 4—4 on FIG. 2 and showing the sample actuating support unit slidably supported on the guide rails of the frame unit, FIG. 5 is a section along line 5—5 on FIG. 4 and showing the actuating elements of the sample actuating support unit, FIG. 6 is an exploded view of the elements shown on FIG. 5, FIG. 7 is a fragmentary elevation showing a standard Siemens Holder M1–15396 and Motor M1–33108 mounted on the sample actuating support unit, FIG. 8 is a fragmentary elevation showing a conventional sample holding yoke mounted on the sample actuating support unit, and FIG. 9 is a fragmentary elevation showing a goniometer mounted on the extending end of the accessory shaft, and surrounded by a circular film cassette supported by a cassette support removably supported by the sample actuating support unit.

Referring to FIG. 1, FIG. 2 and FIG. 3, camera 15 has a frame unit 16 which slidably supports the sample actuating support unit 18. The frame unit 16 has two vertical upright side members 19 which support horizontal guide means, such as guide rails 20, which are best shown on FIG. 2. The right hand side member 19, as shown on FIG. 1, may be firmly joined to the guide rails 20 by any suitable means such as a press fit, screws, pins, or threads. The other side member 19 is preferably joined to the guide rails in a manner permitting sliding movement while at the same time permitting the side member to be firmly retained at any selected position. As best shown on FIG. 3, the lower end of the side member 19 contains bores for slidably receiving the guide rails, and is further slotted betweeen the bores and the end of the side member to provide the conventional clamping structure which may be tightened against the guide rails by means of lock screw 22. This arrangement provides a simple structure permitting the changing of the distance between the side members, as well as for the removal or installation of the sample actuating support unit.

As best shown on FIG. 1, a standard collimator tube 24 and a conventional X-ray absorber or stop 26 are coaxially supported by the side members on the X-ray axis. In use, the X-rays are introduced through the collimator tube, engage the material sample to be photographed, and are then absorbed by the X-ray stop 26. The outer face of the side member supporting the collimator tube has a pair of retaining lugs 27 joined thereto. The retaining lugs are configured to engage mating slots in the camera mount of the diffraction unit on which the camera is to be used. Other mounting methods may be used as desired; the particular mounting method not constituting a portion of the invention.

Coaxially mounted on the X-ray axis, to be adjacent to the inner face of each side member, is a disc film holding cassette 28. Cassettes of the type used are well known to the art, and comprise an opaque body 28a which received the disc film which is then covered with opaque paper; the film and paper being then held in place by a circular flanged ring 28b which engages the body by means of bayonette locks. The cassettes may be rotatably mounted by any convenient and well known means. A spacer washer 29 is joined to the inner face of the right side member shown on FIG. 1, to be between the side member and the cassette. The washer 29 is used to accommodate the particular collimator tube used, and may be omitted if a shorter collimator tube is used.

Each film cassette 28 is rotated by a suitable drive means mounted on the side members. The particular drive means used may comprise a reversible motor 30 having an integral reduction gear 30a terminating in a shaft 30b which engages the periphery of the cassette. The motor-reduction gear assembly may be joined to the outer face of each side member by one or more screws 31 as shown on FIG. 3. The disclosure to this point constitutes the frame unit 16.

The sample actuating support unit 18, which is removably supported by the frame unit, is best shown on FIG. 4, FIG. 5 and FIG. 6. Body 32 contains horizontal bores passing through the lower portion for slidably receiving the guide rails 20 of the frame unit, as shown on FIG. 4. The portion of the body between the bores and the bottom end is slotted to provide a conventional clamping structure which may be tightened against the guide rails by means of lock screw 34. A pinion support block 36, whose purpose will become more obvious, is joined to the lower end of body 32 by screws (not shown). If desired, the pinion support block may be made to be integral with the body. The body further contains a vertical bore 38 positioned to be between the guide rails 20. As best shown on FIG. 6, the bore 38 in body 32 has a first counterbore 39 at the upper end which terminates at the bottom in a smaller diameter second counterbore 40, and further has a third counterbore 41 at the lower end thereof. Contained within the third counterbore 41 is an axially bored bushing 42 having a transverse arcuate groove 43 which is longitudinally located to be engaged by lock screw 34 which holds the bushing in place. The pinion support block 36 contains a bore 36a of substantially the same diameter as the bore in bushing 42 and located to be coaxial with bushing 42 and bore 38 in body 32.

An accessory support and actuating subassembly is slidably supported within first counterbore 39 at the upper end of body 32. This subassembly has an elongated bushing 44 having a bore coaxial with bore 38 in body 32, and further having a longitudinal slot which is engaged by a rotation preventing means such as the male dog point set screw 45 to prevent the bushing from rotating in body 32 while permitting longitudinal sliding motion. The accessory support and actuating subassembly further has an accessory shaft 46 journaled in bushing 44, and having a flange 46a near the upper end which nests in a counterbore in the upper end of bushing 44. A retainer means such as collar 48 is held in place on the lower extending end of the accessory shaft by means of a set screw 49. The collar, as shown on FIG. 5 is located to prevent any appreciable longitudinal movement of the shaft in the bushing and nests within the second counterbore 40 in body 32. The upper end of accessory shaft 46 extends from the upper end of body 32 and forms the element to which all interchangeable accessories may be removably mounted, as will be hereinafter explained. The lower end of the accessory shaft extending through bushing 44 further contains an axial counterbore 46b and a longitudinal slot 46c through the wall formed by the periphery of the shaft and the counterbore as best shown on FIG. 6. The function of the counterbore and the longitudinal slot will be explained hereinafter.

A drive shaft 50 is journalled in bushing 42 with the upper end thereof engaging the counterbore 46b in accessory shaft 46, and with the lower end extending through the bore in pinion support block 36, as best shown on FIG. 5. A relatively wide spur gear 52 is joined to shaft 50 by means of set screw 53 and imparts rotary motion to the shaft. The construction details of drive shaft 50 are best shown on FIG. 6. The upper end of the shaft is provided with a reduced diameter portion 50a which extends from shoulder portion 50b and slidably engages counterbore 46b in accessory shaft 46. A small pin 54 is transversely joined to the upper end of the shaft and slidably engages the longitudinal slot 46c in accessory shaft 46, as shown on FIG. 5. The lower end of the accessory shaft 46 engages the upper face of shoulder portion 50b as also shown on FIG. 5. It is thus seen that the slidable union between the drive shaft 50 and the accessory shaft 46 is one which will provide for two motions: (1) rotating shaft 50 will rotate shaft 46 through the pin 54 which engages the slot in shaft 46, and (2) raising shaft 50 will raise the accessory support and actuating subassembly; bushing 44 sliding on the dog point set screw 45 which engages slot 44a in the bushing. It is noted that the construction is such that the rotary and linear motions may be used both severally and jointly, and in any ratio. That portion of drive shaft 50 extending below the shoulder portion 50b has a nonhelical circular rack 50c which is engaged by pinion 56 which is suitably journalled in the pinion support block 36, as best shown on FIG. 5.

Referring now to FIG. 1, rotary motion of shaft 50 is produced by motor 58 which is joined to the pinion support block 36, and further has a built-in reduction gear train, the final gear 58a engaging spur gear 52. The particular motor used was Siemens and Halske Model No. U6 Q4-295. Vertical motion of shaft 50 is produced by motor 60 (R. W. Cramer Co., Inc., Type 112) driving an attached reduction gear 60a terminating in a final drive shaft having a pin 60b. The construction of the final drive shaft and pin 60b is identical with the construction of portion 50a and pin 54 on drive shaft 50. The end of the final drive shaft slidably engages a counterbore 56a, while pin 60b engages a slot 56b in pinion 56; the counterbore 56a and slot 56b being shown on FIG. 6. A mounting pin 62 is joined to the end of reduction gear 60a. This mounting pin, which is parallel to the final drive shaft on reduction gear 60a, slidably engages a bore 36b in the side of the pinion support block 36; bore 36b being best shown on FIG. 5 and FIG. 6. The particular method of mounting motor 60 was primarily to provide an easy method for returning the apparatus to its initial starting position, as will be explained.

As is readily seen on FIG. 1, FIG. 4 and FIG. 5, there is clearance between the bottom of the pinion support block 36 and the top of spur gear 52. This clearance must be at least equal to the maximum amount of linear movement required for the various procedures for which the camera is adapted. The width of the spur gear should be somewhat wider than the above mentioned clearance in order that geared engagement with motor 58 will not be interrupted regardless of the linear position of the gear. The normal starting position for all photographic procedures is from the bottom position shown on the drawings. Since the rate of linear movement is very small and for a prolonged period of time, the easiest method of setting the camera to its initial position is to pull motor 60 out of engagement, and then manually rack shaft 50 to its bottom position, after which the motor is again engaged.

Not all motors are necessary for all camera procedures. The particular motors necessary will be mentioned with the various procedures to be discussed hereinafter. The wiring circuits and switches are all standard and have been omitted. Suitable limit switches and timing devices may be provided, if desired. There is no reason why all motors should not be unidirectional.

Referring to FIG. 7, FIG. 8 and FIG. 9, all of the accessories shown mounted on the sample actuating support unit 18 are configured to place the critical points on the X-ray axis, as shown. This assures a truly universal camera which may remain attached to the diffraction unit in its entirety and does not require partial disassembly and reassembly when the function of the camera is to be altered. Nothing on the sample actuating support unit 18, as shown on FIG. 1, need at any time be altered, and only when using the cylindrical film cassette 64, as shown on FIG. 9, does it become necessary to remove the right hand disc film holding cassette 28 in order to provide sufficient clearance for the inner end of the collimator tube 24 to enter into the cylindrical film cassette through a suitable passage.

Referring specifically to FIG. 7, there is shown a conventional Siemens Holder (M1–15396) 66 driven by a motor M1–33108 which is identical with motor 58 shown on FIG. 1, and is therefore referred to as motor 58. A sleeve adaptor 68 provides the connecting link between holder 66 and the protruding end of accessory shaft 46. The lower end of the sleeve adaptor 68 is provided with a first axial bore for sliding over the upper end of the accessory shaft, where the adaptor is held in place by screw 69. The upper end of the sleeve adaptor is provided with a second axial bore for slidably receiving the stub mounting shaft 66a which is downwardly extending from holder 66. The sleeve adaptor is further provided with a vertical slot for slidably receiving pin 66b which extends from the side of the stub mounting shaft for the purpose of circumferentially positioning the holder in any camera apparatus.

The arrangement of the elements shown on FIG. 7 permits the functions and techniques previously associated with holder 66. In addition, these previous functions and techniques may now be vertically integrated through the vertical movement of drive shaft 50 in the manner previously described. The functions and techniques previously associated with holder 66 are all well known in the art and are discussed in standard texts.

Now referring specifically to FIG. 8, a sample holder 70 is shown in mounted position on sample actuating support unit 18, where it is retained by screw 69 in the manner previously described. The sample holder 70 may be formed of any convenient yoke element 70a which is pivotally joined to base element 70b by means of screw 71. Sample 72, which is under investigation, may be retained by screws (not shown) or by any other convenient means. It is noted that the sample may be rotated, tilted, and vertically integrated. The arrangement of elements shown on FIG. 8 will be found useful in making residual stress measurements, texture measurements, Laue photographs for recovery polygonization and recrystallization studies, and other techniques which will be apparent to those practicing crystallography.

Referring to FIG. 9, a goniometer 74, such as manufactured by Stoe and Cie G.m.b.H. of Heidelberg, Germany, is shown in mounted position on sample actuating support unit 18. The goniometer itself is screwed to an adaptor 76 which is joined to accessory shaft 46 in the manner previously described in connection with FIG. 7. A removable cassette support 78 is joined to the sample actuating support unit 18, to be positioned as shown. Although there are other methods of construction, the cassette support is preferably made in a manner which will permit attachment and detachment while the goniometer is in position. One convenient method of construction is to form the cassette support with a circular sleeve member 78a which has internal threads at the lower end thereof for engaging mating external threads at the upper end of base member 78b. The base member 78b is formed in two halves on a vertical split line; the two halves, when joined, having a vertical bore for surrounding the actuating support unit.

The two halves of base member 78b are held in place by means of two lock screws 80 having the same general configuration as lock screws 34 shown on FIG. 4. The base member 78b may easily be attached and detached with lateral movement only, when the lock screws 80 are removed. The desirability of the described construction is because the bore in the base member 78b is smaller than the goniometer, which therefore cannot pass through the bore in the base member. The circular sleeve member 78a is provided with a vertical slit (not shown) which, in conjunction with a lock screw 82 similar to lock screw 34 as shown on FIG. 4, permits the circular sleeve member 78a to be firmly drawn against the cylindrical film cassette to form a light tight union. The film cassette 64 is of the long cylindrical type, well known to the art, and used to house a flat sheet of film curled therein. The upper open end of the cassette may be plugged with a light sealing element such as a black rubber cork 64a. An X-ray absorber 64b is attached to the cassette in such position that it is 180° from the port through which the collimator tube 24 enters the cassette. It is noted from the elements shown that a sample 84 mounted in the goniometer may be rotated and may be vertically integrated by movement of the drive shaft 50.

The arrangement of elements shown on FIG. 9 may be used to perform functions and techniques including but not limited to single crystal rotation photographs, powder photography, orientation in wires, and single crystal perfection studies.

Other functions and techniques may be performed by omitting the cylindrical film cassette 64 and using either or both of the disc film holding cassettes 28 shown on FIG. 1. These functions and techniques include but are not limited to transmission and reflection Laue photographs for crystal orientation, axial twist in crystals, precision in lattice constants, wire pole figures, and identification photographs.

Although the sample actuating support unit 18 has been shown and described in connection with a crystallography camera, it is obvious that this apparatus may also be used to advantage on other laboratory equipment and in control apparatus in which rotary and linear motion are to be combined.

It is to be understood that the embodiment of the present invention as shown and described is to be regarded as illustrative only and that the invention is susceptible to variations, modifications and changes within the scope of the appended claims.

We claim:

1. A universal X-ray crystallography camera adapted for supporting and actuating interchangeable sample holding attachments orienting a test specimen in an X-ray beam generated by an external generator and passing through the camera comprising: an elongated frame unit having horizontal elongated guide means each end of which has a vertical upright side member containing a coaxial passage therethrough parallel to said horizontal elongated guide means and adapted for joining to the X-ray generator with the coaxial passages through the vertical upright side members coaxial with the X-ray beam emitting from the X-ray generator, said elongated frame unit further having a disc film holding cassette removably and rotatably joined to the inner face of each of said vertical upright side members with the axis of each of said disc film holding cassette on the coaxial axis of the passages through the vertical upright side members, and drive means joined to each of said vertical upright side members and engaging the adjacent disc film holding cassette for rotating the cassette about its axis of rotation; and a sample actuating support unit, said sample actuating support unit comprising a vertically extending body having a vertical bore therethrough counterbored to an enlarged diameter at the upper end of said body, said body further having transverse guide means for slidably engaging the horizontal elongated guide means on said frame unit, an elongated bushing slidably supported within the counterbore in said body, said bushing having an axial bore, rotation preventing means cooperatively joining said body and said elongated bushing for preventing rotation of said bushing while permitting longitudinal sliding of said bushing in said body, an accessory shaft rotatably journalled in said elongated bushing and having an upper end extending above said body for joining to the interchangeable sample holding attachments and a lower end extending from said bushing into the vertical bore in said body, the lower end of said accessory shaft having an axial counterbore and a longitudinal slot through the wall formed by the periphery of the lower end of said accessory shaft and the counterbore therein, retainer means joined to said accessory shaft and engaging said elongated bushing for preventing relative axial movement between said elongated bushing and said accessory shaft, a drive shaft journalled within the vertical bore of said body, said drive shaft having a reduced diameter upper end portion having a transverse pin and axially engaging the counterbore and longitudinal slot in the lower end of said accessory shaft and terminating at the base in a shoulder portion the upper end of which is in engagement with the bottom end of said accessory shaft and further having a lower end portion extending downward from the lower end of the shoulder portion and extending beyond the lower end of said body, said drive shaft further having a circular rack on a portion of the end extending from said body, a gear coaxially joined to the end of said drive shaft extending from said body, a pinion support block joined to said body and having at least a portion thereof disposed between the lower end of said body and said gear, a pinion rotatably journalled in said pinion support block and engaging the circular rack on said drive shaft, a first drive means engaging said gear for rotating said drive shaft and said accessory shaft, and a second drive means engaging said pinion for axially sliding said drive shaft, said accessory shaft, said elongated bushing and said retainer means in said body, said first and said second drive means acting severally and jointly on command to actuate said drive shaft.

2. A universal X-ray crystallography camera in accordance with claim 1 and in which said rotation preventing means is:
  (a) a longitudinal slot on the periphery of said elongated bushing, and
  (b) a male element joined to said body and projecting into the counterbore in said body and engaging the longitudinal slot on the periphery of said elongated bushing.

3. A universal X-ray crystallography camera adapted for supporting and actuating interchangeable sample holding attachments orienting a test specimen in an X-ray beam generated by an external generator and passing through the camera comprising: an elongated frame unit having horizontal elongated guide means each end of which has a vertical upright side member containing a coaxial passage therethrough parallel to said horizontal elongated guide means and adapted for joining to the X-ray generator with the coaxial passages through the vertical upright side members coaxial with the X-ray beam emitting from the X-ray generator, said elongated frame unit further having a disc film holding cassette removably and rotatably joined to the inner face of each of said vertical upright side members with the axis of each disc film holding cassette on the coaxial axis of the passages through the vertical upright side members, and drive means joined to each of said vertical upright side members and engaging the adjacent disc film holding cassette for rotating the cassette about its axis of rotation; and a sample actuating support unit, said sample actuating support unit comprising a vertically extending body having a vertical bore therethrough counterbored to an enlarged diameter at the upper end of said body, said body further having transverse guide means for slidably engaging the horizontal elongated guide means on said frame unit, an elongated bushing slidably supported within the counterbore in said body, said bushing having an axial bore terminating in a counterbore at the upper end and further having a longitudinal slot on the periphery thereof, a male element joined to said body and projecting into the counterbore in said body and engaging the longitudinal slot on the periphery of said elongated bushing for preventing rotation of said elongated bushing while permitting longitudinal sliding of said bushing in said body, an accessory shaft having a flange nesting within the counterbore in said elongated bushing with an upper end portion thereon extending above said body for joining to the interchangeable sample holding attachments and a lower end journalled in the axial bore in said elongated bushing and extending from said bushing into the vertical bore in said body, the lower end of said accessory shaft having an axial counterbore and a longitudinal slot through the wall formed by the periphery of the lower end of said accessory shaft and the counterbore therein, retainer means joined to the lower extending end of said accessory shaft and engaging the lower end of said elongated bushing for preventing upward axial movement of said accessory shaft in said elongated bushing, a drive shaft journalled within the vertical bore of said body, said drive shaft having a reduced diameter upper end portion having a transverse pin and axially engaging the counterbore and longitudinal slot in the lower end of said accessory shaft and terminating at the base in a shoulder portion the upper end of which is in engagement with the bottom end of said accessory shaft and further having a lower end portion extending downward from the lower end of the shoulder portion and extending beyond the lower end of said body, said drive shaft further having a circular rack on a portion of the end extending from said body, a pinion support block joined to said body and having at least a portion thereof extending below the lower end of said body, a pinion rotatably journalled in said pinion support block and engaging the circular rack on said drive shaft to axially move said drive shaft, a gear coaxially joined to the end of said drive shaft downwardly extending beyond said pinion support block and longitudinally spaced to provide at least as much axial clearance between the top of said gear and the nearest obstructing element as the desired axial movement of said drive shaft from the bottom terminal position in said body, said gear having a tooth width at least as great as the axial clearance between the top of said gear and the nearest obstructing element, a first drive means engaging said gear during the entire axial movement range of said drive shaft for rotating said drive shaft and said accessory shaft, and a second drive means engaging said pinion for axially sliding said drive shaft, said accessory shaft, said elongated bushing and said retainer means in said body, said first and said second drive means acting severally and jointly on command to actuate said drive shaft.

References Cited
UNITED STATES PATENTS 2,713,125   7/1955   Geisler et al. _____ 250—51.5
3,107,297   10/1963   Wittry _____ 250—51.5

OTHER REFERENCES

"General Electric XRD (X-ray Diffraction) Unit," by G. G. Corp., Chicago, Ill., Publication Number 7A-560, June 1939, pages 16 and 17.

RALPH G. NILSON, *Primary Examiner.*

W. F. LINDQUIST, *Examiner.*